2,917,399

MANUFACTURE OF LINOLEUM

Clifford Evans and George de Rome Rack, Manchester, England, assignors to Imperial Chemical Industries Limited, London, England, a corporation of Great Britain No Drawing. Application June 10, 1957
Serial No. 664,510

Claims priority, application Great Britain June 15, 1956

15 Claims. (Cl. 106—228)

This invention relates to improvements in or relating to the manufacture of linoleum, and more particularly to improvements which accelerate the maturing of the linoleum.

In the manufacture of linoleum, there is first made a linoleum composition comprising linoleum cement, cork and/or wood flour, other fillers, for example whiting, and any desired pigments and other minor ingredients, and this linoleum composition is generally granulated, calendered and applied to backing material, and is finally matured by heating. This maturing of the linoleum composition takes a considerable time, frequently as long as 20 days or more, and so entails great delay in the production of the finished linoleum. Furthermore, it is necessary to provide large, heated buildings in which the linoleum must be kept during this time, until it has matured satisfactorily.

It has been proposed to reduce the maturing time of linoleum compositions by using a linoleum cement which has been made by oxidising linseed oil in the presence of rosin, and also by incorporating certain compounds in the linoleum composition, for example urea, and especially boric acid. Apart from reducing the maturing time of the linoleum composition, these additives give little improvement in the finished product.

We have now found that by incorporating certain hydrazides in the linoleum compositions the time required for the maturing of the compositions may be considerably reduced, and the finished linoleum possesses outstandingly good pliability, together with uniform hardness throughout its thickness.

Thus according to our invention we provide an improved process for the manufacture of linoleum which comprises incorporating in the linoleum composition a hydrazide of a carboxylic acid.

As examples of hydrazides of carboxylic acids, suitable for use in the process of the present invention, there may be mentioned the hydrazides of monocarboxylic acids and polycarboxylic acids, for example acetic hydrazide, stearic hydrazide, benzoic hydrazide, 2-hydroxybenzoic hydrazide, p-aminobenzoic hydrazide, p-carboxybenzoic hydrazide, and isonicotinic hydrazide.

Preferably there is used a dihydrazide of an aromatic or a saturated aliphatic dicarboxylic acid for example succinic dihydrazide, malonic dihydrazide, adipic dihydrazide, sebacic dihydrazide and isophthalic dihydrazide.

Another preferred class of hydrazides consists of the hydrazides of saturated aliphatic monocarboxylic acids and in particular a high molecular weight hydrazide such as stearic hydrazide since, although not quite as rapid in their maturing action as the dihydrazides, these compounds possess the advantage of causing less premature hardening, i.e. hardening of the linoleum composition during the mixing operation and during the storage between the mixing and calendering operations.

The amount of the hydrazide employed may vary within wide limits, depending on the particular hydrazide employed, the linoleum composition, and the temperature at which the maturing of the linoleum is to be carried out. Usually an amount up to 5% of the weight of the linoleum cement gives the best results. In the case of very active hydrazides, smaller amounts may suffice.

The linoleum cement may be made by the methods commonly employed in the art, for example by oxidising linseed oil or other drying oil, containing driers, at elevated temperatures with air, either with mechanical agitation or by flooding over cotton scrims, and then melting the oxidised oil with rosin and/or resins. There may also be used linoleum cement prepared in a single stage by oxidation of a mixture of the linseed oil and the rosin and/or resins.

The linoleum composition may be made from linoleum cement, in admixture with powdered cork, wood flour, whiting, pigments, and any other known adjuvants of value in the manufacture of linoleum.

The hydrazide may conveniently be incorporated by mixing the linoleum cement, cork and/or wood flour, fillers, and other ingredients in any desired order, on a rubber mill or in a rotary mixer, for example a Banbury mixer. This incorporation is conveniently carried out at a temperature of about 100° C.

The linoleum composition may subsequently be treated in any way customary in the art. Thus, for example, it may be granulated, calendered and applied to a backing material, for example hessian, or used in conjunction with other similar compositions for the production of variegated effects.

The maturing of the linoleum is carried out by maintaining the linoleum at an elevated temperature, usually between 55° C. and 90° C. until the desired degree of hardening has taken place throughout the product, the time required for this result depending on the temperature employed, and the quantity of hydrazide incorporated.

Linoleum manufactured by the process of our invention has the advantages that it possesses good "through dry," that is to say it possesses a very desirable uniformity of physical properties throughout its thickness, and also shows only slight tendency to discolouration, and possesses an unusually high degree of pliability. The process of our invention has the advantages that maturing of the linoleum may be carried out more quickly than was previously possible, and that the physical properties of linoleum containing wood flour especially is improved.

The invention is illustrated but not limited by the following examples in which the parts are by weight.

In these examples, the linoleum cement was prepared by the "two-stage" process and comprised 15% of rosin and 85% of oxidised linseed oil.

Example 1

300 parts of a linoleum composition comprising 120 parts of linoleum cement, 60 parts of powdered cork, 60 parts of wood flour, 45 parts of whiting and 15 parts of iron oxide, were mixed with 6 parts of sebacic dihydrazide by milling for 5 minutes on a rubber mill with rolls heated to 100° C. The composition was then removed from the mill, allowed to cool, and calendered through unheated rolls to produce a sheet of linoleum approximately 3.5 mm. thick. This sheet was then matured by heating in an oven at a temperature of 85° C. Small samples were removed from it from time to time for examination and the remainder of the sheet was withdrawn from the oven, when full maturing had been attained, as indicated by an indentation test wherein a load of 80 pounds is applied for 15 seconds through a flat-ended cylindrical head having a cross-sectional area of 0.025 square inch, the residual indentation being examined visually 1 hour after removal of the load. This stage was reached after 2 days.

Another sheet of linoleum, made in the same way except that sebacic dihydrazide was not added to the composition, required 22 days to become fully matured.

Further, it was found on testing the two sheets of linoleum after they had been exposed to normal atmospheric conditions for 3 days, that the linoleum containing sebacic dihydrazide was more uniformly hard throughout its thickness and was very much more pliable than the linoleum which did not contain sebacic dihydrazide.

*Example 2*

A sheet of linoleum was prepared and matured at 85° C. in the manner described in Example 1, except that 3 parts of sebacic dihydrazide were used in place of the 6 parts of sebacic dihydrazide. This sheet of linoleum became fully matured in 11 days. The uniformity of maturing throughout the thickness of the sheet and the pliability were improved considerably as compared with a sheet made in the same way but which did not contain sebacic dihydrazide.

*Example 3*

300 parts of a linoleum composition comprising 120 parts of linoleum cement, 120 parts of wood flour, 45 parts of whiting and 15 parts of rutile titanium dioxide were mixed with 6 parts of sebacic dihydrazide by milling for 5 minutes on a rubber mill with rolls heated at 100° C. The composition was removed from the mill in the form of a sheet which was then heated and maintained at a temperature of 85° C. until fully matured, as indicated by removing the sheet from the oven, exposing it to normal atmospheric conditions for 2 hours, and testing it by hand. Another sheet, prepared in the same way, except that sebacic dihydrazide was not added to the composition, required 18 days to become fully matured. The linoleum containing sebacic dihydrazide possessed a considerably improved uniformity of maturing through the thickness and was more pliable, as compared with the linoleum which did not contain sebacic dihydrazide.

*Example 4*

A sheet of linoleum was prepared and matured at 85° C. in the manner described in Example 3, except that 4.5 parts of adipic dihydrazide were substituted for the 6 parts of sebacic dihydrazide. This sheet required 3 days to become fully matured. Another sheet of linoleum, prepared in the same way except that the adipic dihydrazide was omitted, required 18 days to become fully matured. The linoleum containing adipic dihydrazide, was considerably more pliable and more uniformly matured than the linoleum which did not contain adipic dihydrazide.

*Example 5*

A sheet of linoleum was prepared, matured and calendered in the manner described in Example 1, except that 3.4 parts of malonic dihydrazide were substituted for the 6 parts of sebacic dihydrazide. The composition required 2½ days to become fully matured whereas a sample made without the addition of malonic dihydrazide required 17 days. The use of malonic dihydrazide gave a considerable improvement in pliability and uniformity of maturing.

*Example 6*

A sheet of linoleum was prepared, matured and calendered in the manner described in Example 1 except that 1.5 parts of terephthalic dihydrazide were substituted for the 6 parts of sebacic dihydrazide. The sheet was fully matured in 7 days whereas a control sheet from which the terephthalic dihydrazide has been omitted required 15 days to become fully matured. The use of terephthalic dihydrazide gave a considerable improvement in pliability and uniformity of maturing.

*Example 7*

A sheet of linoleum was prepared, matured and calendered in the manner described in Example 3 except that 3 parts of isophthalic dihydrazide were substituted for the 6 parts of sebacic dihyrazide. The composition required 7 days to become fully matured whereas a sample made without the addition of terephthalic dihydrazide required 15 days to become fully matured. The use of terephthalic hihydrazide gave a considerable improvement in pliability and uniformity of maturing.

*Example 8*

300 parts of a linoleum composition comprising 120 parts of linoleum cement, 60 parts of powdered cork, 60 parts of wood flour, 45 parts of whiting and 15 parts of iron oxide, were mixed with 6 parts of acetic hydrazide by milling for 5 minutes on a rubber mill with rolls heated to 100° C. The composition was then removed from the mill, allowed to cool, and calendered through unheated rolls to produce a sheet of linoleum approximately 3.5 mm. thick. This sheet was then matured by heating in an oven at a temperature of 85° C. Small samples were removed from it from time to time for examination and the remainder of the sheet was withdrawn from the oven, when full maturing had been attained, as indicated by an indentation test wherein a load of 80 pounds is applied for 15 seconds through a flat-ended cylindrical head having a cross-sectional area of 0.025 square inch, the residual indentation being examined visually 1 hour after removal of the load. This stage was reached after 7 days.

Another sheet of linoleum, made in the same way except that acetic hydrazide was not added to the composition, required 15 days to become fully matured.

Further, it was found on testing the two sheets of linoleum after they had been exposed to normal atmospheric conditions for 3 days, that the linoleum containing acetic hydrazide possessed a better balance of through hardness and pliability than the linoleum which did not contain acetic hydrazide.

*Example 9*

A sheet of linoleum was prepared and matured at 85° C. in the manner described in Example 8, except that 6 parts of p-aminobenzoic hydrazide were used in place of the 6 parts of acetic hydrazide. This sheet of linoleum became fully matured in 7 days. The resulting balance between through hardness and pliability was much better than in a sheet prepared in the same way, but containing no p-aminobenzoic hydrazide.

*Example 10*

300 parts of a linoleum composition comprising 120 parts of linoleum cement, 120 parts of wood flour, 45 parts of whiting and 15 parts of rutile titanium dioxide were mixed with 6 parts of isonicotinic hydrazide by milling for 5 minutes in a Banbury mixer at 100° C. The composition was calendered to form a sheet, which was then heated and maintained at 85° C. until fully matured, as indicated by removing the sheet from the oven, exposing it to normal atmospheric conditions for 2 hours, and testing it by hand. The sheet was fully matured in 3 days. A sheet prepared in the same way except that the isonicotinic hydrazide was not added to the composition required 16 days to become fully matured. The linoleum containing isonicotinic hydrazide showed a better balance between through hardness and pliability, as compared with the linoleum which did not contain isonicotinic hydrazide.

*Example 11*

A sheet of linoleum was prepared and matured at 85°

C. in the manner described in Example 10 except that 6 parts of 2-hydroxybenzoic hydrazide were substituted for the 6 parts of isonicotinic hydrazide. The resulting sheet required 6 days to become fully matured and had a better balance of through hardness and pliability than a sheet containing no 2-hydroxybenzoic hydrazide.

*Example 12*

A sheet of linoleum was prepared and matured as described in Example 8 except that 3 parts of stearic hydrazide were substituted for the 6 parts of acetic hydrazide. The composition was fully matured after 7 days and gave a sheet possessing a better balance of through hardness and pliability than the sheet containing no stearic hydrazide.

What we claim is:

1. In a process for the manufacture of linoleum wherein a linoleum composition comprising a mixture of linoleum cement and at least one member of the group consisting of cork and wood flour is matured by heating, the improvement whereby maturing time is reduced, said improvement comprising including in said linoleum composition a hydrazide of a carboxylic acid selected from the group consisting of monocyclic aromatic and saturated aliphatic mono- and dicarboxylic acids, the amount of hydrazide being up to 5% of the weight of the linoleum cement.

2. A linoleum composition suitable for the manufacture of linoleum which comprises a mixture of linoleum cement, at least one member of the group consisting of cork and wood flour and a hydrazide of a carboxylic acid selected from the group consisting of monocyclic aromatic and saturated aliphatic mono- and dicarboxylic acids, the amount of hydrazide being up to 5% of the weight of the linolum cement.

3. A linoleum composition as defined in claim 2 wherein the hydrazide is a hydrazide of a monocyclic aromatic dicarboxylic acid.

4. A linoleum composition as defined in claim 2 wherein the hydrazide is a hydrazide of a saturated aliphatic dicarboxylic acid.

5. A linoleum composition as defined in claim 2 wherein the hydrazide is a hydrazide of a saturated aliphatic monocarboxylic acid.

6. Linoleum comprising the heat matured product of a linoleum composition comprising linoleum cement, a member of the group consisting of cork and wood flour and a hydrazide of a carboxylic acid selected from the group consisting of monocyclic aromatic and saturated aliphatic mono- and dicarboxylic acids, the amount of hydrazide being up to 5% of the weight of the linoleum cement.

7. A linoleum composition as defined in claim 2 wherein said hydrazide is sebacic dihydrazide.

8. A linoleum composition as defined in claim 2 wherein said hydrazide is adipic dihydrazide.

9. A linoleum composition as defined in claim 2 wherein said hydrazide is terephthalic dihydrazide.

10. A linoleum composition as claimed in claim 2 wherein said hydrazide is isophthalic dihydrazide.

11. A linoleum composition as claimed in claim 2 wherein said hydrazide is acetic hydrazide.

12. A linoleum composition as claimed in claim 2 wherein said hydrazide is p-aminobenzoic hydrazide.

13. A linoleum composition as claimed in claim 2 wherein said hydrazide is isonicotinic hydrazide.

14. A linoleum composition as claimed in claim 2 wherein said hydrazide is 2-hydroxybenzoic hydrazide.

15. A linoleum composition as claimed in claim 2 wherein said hydrazide is stearic hydrazide.

References Cited in the file of this patent

UNITED STATES PATENTS

| | | |
|---|---|---|
| 1,236,367 | Barton | Aug. 7, 1917 |
| 2,308,595 | Drummond et al. | Jan. 19, 1943 |
| 2,512,667 | Moncrieff | June 27, 1950 |
| 2,594,345 | Powers et al. | Apr. 29, 1952 |

OTHER REFERENCES

Traube et al.: "Ber. Deut. Chem. Ges.," 29, 670–675 (1896).

Traube et al.: "Ber. Deut. Chem. Ges.," 29, 2729 and 2730 (1896).

Nietski et al.: "Ber. Deut. Chem. Ges.," 30, 548 (1897).

Migrdichian: "Organic Syntheses," vol. I, page 394 (1957).